(12) United States Patent
Zheng

(10) Patent No.: US 11,310,139 B2
(45) Date of Patent: Apr. 19, 2022

(54) FAULT DETECTION FOR LACP PACKET TIMEOUT

(71) Applicant: Hangzhou DPtech Technologies Co., Ltd., Zhejiang (CN)

(72) Inventor: Lei Zheng, Zhejiang (CN)

(73) Assignee: Hangzhou DPtech Technologies Co., Ltd., Zhejiang (CN)

( * ) Notice: Subject to any disclaimer, the term of this patent is extended or adjusted under 35 U.S.C. 154(b) by 92 days.

(21) Appl. No.: 17/039,626

(22) Filed: Sep. 30, 2020

(65) Prior Publication Data

US 2021/0111978 A1 Apr. 15, 2021

(30) Foreign Application Priority Data

Oct. 9, 2019 (CN) .......................... 201910954050.6

(51) Int. Cl.
*H04L 12/709* (2013.01)
*H04W 72/10* (2009.01)
(Continued)

(52) U.S. Cl.
CPC .......... *H04L 43/0829* (2013.01); *H04L 43/18* (2013.01); *H04L 45/245* (2013.01); *H04L 69/24* (2013.01)

(58) Field of Classification Search
CPC ............. H04L 43/0829; H04L 41/0631; H04L 41/0677; H04L 43/18; H04L 45/245;
(Continued)

(56) References Cited

U.S. PATENT DOCUMENTS 9,992,102 B2 * 6/2018 Chhabra ................. H04L 45/28
10,243,781 B1 3/2019 Kalburgi
(Continued)

FOREIGN PATENT DOCUMENTS

CN 1925429 A 3/2007
CN 101039224 A 9/2007
(Continued)

OTHER PUBLICATIONS

Rong, J. et al., "Research of Link Aggregation Cross Systems Based on LACP," Video Engineering, Wide Band Network, Apr. 2, 2013,3 pages. (Submitted with English Abstract).
(Continued)

*Primary Examiner* — Edan Orgad
*Assistant Examiner* — Vanneilian Lalchinthang
(74) *Attorney, Agent, or Firm* — McCoy Russell LLP

(57) ABSTRACT

A fault detection method of LACP packet timeout provided including: receiving a LACP packet from a target port of the partner device through a local port, the LACP packet at least includes a phase identifier to indicate a negotiation phase of a LACP negotiation process between the target port and the local port; sending a response LACP packet corresponding to the LACP packet to the target port through the local port; generating a LACP service processing entry for the LACP packet to indicate a LACP service processing phase performed by the actor device for the LACP packet; in response to that no LACP packet from the target port being received through the local port continues for a preset waiting time, performing fault detection based on the phase identifier and the LACP service processing entry so to obtain fault cause information to indicate a LACP packet timeout of the target port.

19 Claims, 3 Drawing Sheets

(51) Int. Cl.
*H04L 29/06* (2006.01)
*H04L 43/0829* (2022.01)
*H04L 43/18* (2022.01)
*H04L 45/24* (2022.01)
*H04L 69/24* (2022.01)

(58) Field of Classification Search
CPC ....... H04L 69/06; H04L 69/24; H04L 47/125; H04L 49/30; H04L 69/28; H04L 45/28; H04L 47/41; Y02D 30/50; H04W 72/10; H04B 1/00
USPC .......................................................... 370/252
See application file for complete search history.

(56) References Cited

U.S. PATENT DOCUMENTS

| | | | |
|---|---|---|---|
| 2006/0002388 A1* | 1/2006 | Grebus | H04L 63/164 370/389 |
| 2008/0174449 A1* | 7/2008 | Schmidt | G08C 17/00 340/4.3 |
| 2014/0241374 A1* | 8/2014 | Krishnamurthy | H04L 49/552 370/401 |
| 2015/0016294 A1 | 1/2015 | Hegge | |
| 2015/0124591 A1* | 5/2015 | Nakagawa | H04L 41/0659 370/225 |
| 2016/0014032 A1* | 1/2016 | Ao | H04L 47/125 370/236 |
| 2016/0134477 A1* | 5/2016 | Guo | H04L 41/0836 370/254 |
| 2019/0065426 A1* | 2/2019 | Das Sharma | G06F 13/4027 |
| 2020/0136959 A1* | 4/2020 | Song | H04L 45/245 |

FOREIGN PATENT DOCUMENTS

| | | | | |
|---|---|---|---|---|
| CN | 101459547 | A | 6/2009 | |
| CN | 101674208 | A | 3/2010 | |
| CN | 102469483 | A | 5/2012 | |
| CN | 102624584 | A | 8/2012 | |
| CN | 103138988 | A | 6/2013 | |
| CN | 103514565 | A | 1/2014 | |
| CN | 104917624 | A | 9/2015 | |
| CN | 105790975 | A | 7/2016 | |
| CN | 105991353 | A | 10/2016 | |
| CN | 107534576 | A | 1/2018 | |
| CN | 107657425 | A | 2/2018 | |
| CN | 108616418 | A | 10/2018 | |
| CN | 108632099 | A | 10/2018 | |
| CN | 109669766 | A | 4/2019 | |
| CN | 110166356 | A | 8/2019 | |
| WO | WO-2009030170 | A1 * | 3/2009 | ......... H04L 41/0677 |
| WO | 2014002525 | A1 | 1/2014 | |

OTHER PUBLICATIONS

Li P., "Network Reliability Analysis and design of real-time data processing System," Electronic Technology & Software Engineering, Jan. 31, 2018, 3 pages. (Submitted with English Abstract).

State Intellectual Property Office of the People's Republic of China, Office Action and Search Report Issued in Application No. 201910954050.6, dated Nov. 30, 2021, 12 pages. (Submitted with Machine Translation).

* cited by examiner

FAULT DETECTION FOR LACP PACKET TIMEOUT

CROSS REFERENCE TO RELATED APPLICATIONS

The present application claims priority to Chinese Patent Application No. 201910954050.6 filed on Oct. 9, 2019. The entire contents of the above-listed application is hereby incorporated by reference for all purposes.

TECHNICAL FIELD

The present application relates to the field of communication technology, and more specifically to methods and apparatuses of detecting a fault due to a LACP packet timeout, electronic devices, and machine-readable storage mediums.

BACKGROUND

As the scale of the network becomes larger and the networking becomes more complex, the traffic pressure between a plurality of network devices is also increasing, so that connecting a plurality of network devices through only a single link cannot meet the continuously increasing demand for traffic bandwidth. In order to meet the demand, link aggregation technology is usually used to achieve link interconnection between a plurality of network devices.

Link aggregation technology is a network technology that aggregates multiple links between a plurality of network devices to form an aggregated logical link. Based on the link aggregation technology, the communication bandwidth between a plurality of network devices can be increased and the redundancy of link connection can be improved. Generally, the link aggregation technology involves a dynamic aggregation technology based on Link Aggregation Control Protocol (LACP). Wherein, LACP is a network protocol of link dynamic aggregation based on IEEE802.3ad standard. Based on LACP, a plurality of network devices can negotiate port information by interacting through one or more LACP packets, thereby completing dynamic aggregation of links.

SUMMARY

This application provides a method of detecting a fault due to a LACP packet timeout, the method being applicable to a member device in a link aggregation networking which comprises an actor device as a LACP packet receiver and a partner device as a LACP packet sender, the method comprises: receiving, by the actor device and through a local port, a first LACP packet from a target port of the partner device, wherein the first LACP packet at least comprises a phase identifier to indicate a negotiation phase of a LACP negotiation process between the target port and the local port; sending, by the actor device and through the local port, a response LACP packet corresponding to the first LACP packet to the target port; generating, by the actor device, a LACP service processing entry for the first LACP packet to indicate a LACP service processing phase performed by the actor device for the first LACP packet; performing, by the actor device and in response to that no LACP packet from the target port being received through the local port continues for a preset waiting time, fault detection based on the phase identifier and the LACP service processing entry so to obtain fault cause information to indicate a LACP packet timeout of the target port.

Optionally, the phase identifier is carried in a reserved field concerning port of the first LACP packet.

Optionally, the member device comprises a plurality of LACP packet processors, each of the plurality of LACP packet processors corresponds to one of a plurality of LACP service processing phases; and the LACP service processing entry at least comprises: LACP negotiation basic information to indicate one or more port LACP negotiation parameters determined by a LACP negotiation between the target port and the local port; a LACP service processing identifier to indicate an order of the LACP service processing phases and the fault cause information.

Optionally, generating a LACP service processing entry for the first LACP packet comprising: analyzing, by the actor device, the first LACP packet so to obtain the LACP negotiation basic information corresponding to the first LACP packet; performing, by the plurality of LACP packet processors, an auto-increment operation to a value of the phase identifier so to determine a plurality of LACP service processing identifiers, each of the plurality of LACP service processing identifiers corresponds one of the plurality of LACP service processing phases; and writing, by the actor device, the plurality of LACP service processing identifiers and the LACP negotiation basic information into the LACP service processing entry for the first LACP packet.

Optionally, the method further comprises: generating, by the actor device, a second LACP packet carrying a phase identifier of which a value has been subjected to the auto-increment operation; and sending, by the actor device, the second LACP packet from the local port to the target port.

Optionally, the LACP service processing entry further comprises fault cause information which is associated with the LACP service processing identifier and indicates a fault cause leading to an error during a LACP service processing executed by the LACP packet processor.

Optionally, performing, by the actor device and in response to that no LACP packet from the target port being received through the local port continues for a preset waiting time, fault detection based on the phase identifier and the LACP service processing entry so to obtain fault cause information to indicate a LACP packet timeout of the target port, comprising: determining, by the actor device and in response to that no LACP packet from the target port being received through the local port continues for the preset waiting time, all LACP service processing entries for the target port based on the phase identifier; determining, by the actor device and from the all LACP service processing entries, a LACP service processing entry with a packet loss fault as a fault cause entry; searching, by the actor device, the fault cause entry for the fault cause information.

Optionally, the method further comprises: obtaining, by the actor device, LACP negotiation basic information from the fault cause entry; outputting, by the actor device and based on the LACP negotiation basic information and the fault cause information obtained from the fault cause entry, an alarm for user to locate a LACP fault.

Optionally, the method further comprises: performing, by the actor device and in response to that a third LACP packet from the target port is received through the local port within the preset waiting time, a LACP negotiation based on continuously sending and receiving one or more LACP packets with the phase identifier between the local port and the target port until the LACP negotiation between the local port and the target port is completed.

The present application also provides an apparatus of detecting a fault due to a LACP packet timeout, the apparatus being applicable to a member device in a link aggregation networking which comprises an actor device as a LACP packet receiver and a partner device as a LACP packet sender, the apparatus comprises: a transceiver module configured to receive, by the actor device and through a local port, a first LACP packet from a target port of the partner device, and send a response LACP packet corresponding to the first LACP packet to the target port, wherein the first LACP packet at least comprises a phase identifier to indicate a negotiation phase of a LACP negotiation process between the target port and the local port; a generating module configured to generate, by the actor device, a LACP service processing entry for the first LACP packet to indicate a LACP service processing phase performed by the actor device for the first LACP packet; a detecting module configured to perform, by the actor device and in response to that no LACP packet from the target port being received through the local port continues for a preset waiting time, fault detection based on the phase identifier and the LACP service processing entry so to obtain fault cause information to indicate a LACP packet timeout of the target port.

Optionally, the phase identifier is carried in a reserved field concerning port of the first LACP packet.

Optionally, the member device comprises a plurality of LACP packet processors, each of the plurality of LACP packet processors corresponds to one of a plurality of LACP service processing phases; and the LACP service processing entry at least comprises: LACP negotiation basic information to indicate one or more port LACP negotiation parameters determined by a LACP negotiation between the target port and the local port; a LACP service processing identifier to indicate an order of the LACP service processing phases and the fault cause information.

Optionally, the generating module is further configured to: analyze, by the actor device, the first LACP packet so to obtain the LACP negotiation basic information corresponding to the first LACP packet; perform, by the plurality of LACP packet processors, an auto-increment operation to a value of the phase identifier so to determine a plurality of LACP service processing identifiers, each of the plurality of LACP service processing identifiers corresponds one of the plurality of LACP service processing phases; and write, by the actor device, the plurality of LACP service processing identifiers and the LACP negotiation basic information into the LACP service processing entry for the first LACP packet.

Optionally, the generating module is further configured to: generate, by the actor device, a second LACP packet carrying a phase identifier of which a value has been subjected to the auto-increment operation; and send, by the actor device, the second LACP packet from the local port to the target port.

Optionally, the LACP service processing entry further comprises fault cause information which is associated with the LACP service processing identifier and indicates a fault cause leading to an error during a LACP service processing executed by the LACP packet processor.

The detecting module is further configured to: determine, by the actor device and in response to that no LACP packet from the target port being received through the local port continues for the preset waiting time, all LACP service processing entries for the target port based on the phase identifier; determine, by the actor device and from the all LACP service processing entries, a LACP service processing entry with a packet loss fault as a fault cause entry; search, by the actor device, the fault cause entry for the fault cause information.

Optionally, the detecting module is further configured to: obtain, by the actor device, LACP negotiation basic information from the fault cause entry; output, by the actor device and based on the LACP negotiation basic information and the fault cause information obtained from the fault cause entry, an alarm for user to locate a LACP fault.

Optionally, the transceiver module is further configured to: perform, by the actor device and in response to that a third LACP packet from the target port is received through the local port within the preset waiting time, a LACP negotiation based on continuously sending and receiving one or more LACP packets with the phase identifier between the local port and the target port until the LACP negotiation between the local port and the target port is completed.

The present application also provides an electronic device, wherein the electronic device being applicable to a member device in a link aggregation networking which comprises an actor device as a LACP packet receiver and a partner device as a LACP packet sender, the electronic device, the electronic device comprising: a communication interface; a processor; a memory for storing machine-readable instructions executable by the processor to perform: receiving, by the actor device and through a local port, a first LACP packet from a target port of the partner device, wherein the first LACP packet at least comprises a phase identifier to indicate a negotiation phase of a LACP negotiation process between the target port and the local port; sending, by the actor device and through the local port, a response LACP packet corresponding to the first LACP packet to the target port; generating, by the actor device, a LACP service processing entry for the first LACP packet to indicate a LACP service processing phase performed by the actor device for the first LACP packet; performing, by the actor device and in response to that no LACP packet from the target port being received through the local port continues for a preset waiting time, fault detection based on the phase identifier and the LACP service processing entry so to obtain fault cause information to indicate a LACP packet timeout of the target port.

The present application also provides a machine-readable storage medium having machine-readable instructions stored thereon, and when invoked and executed by a processor, the machine-readable instructions implement: receiving, by the actor device and through a local port, a first LACP packet from a target port of the partner device, wherein the first LACP packet at least comprises a phase identifier to indicate a negotiation phase of a LACP negotiation process between the target port and the local port; sending, by the actor device and through the local port, a response LACP packet corresponding to the first LACP packet to the target port; generating, by the actor device, a LACP service processing entry for the first LACP packet to indicate a LACP service processing phase performed by the actor device for the first LACP packet; performing, by the actor device and in response to that no LACP packet from the target port being received through the local port continues for a preset waiting time, fault detection based on the phase identifier and the LACP service processing entry so to obtain fault cause information to indicate a LACP packet timeout of the target port.

Through the above embodiments, a phase identifier to indicate a negotiation phase of a port LACP negotiation process is carried based on a reserved field of a LACP packet; and a LACP service processing entry corresponding to the LACP packet is generated to record a LACP service processing process performed by an actor device for the LACP packet. If a timeout fault occurs when the local port receives a LACP packet from a target port, the fault detection is performed based on the phase identifier and the LACP service processing entry to obtain corresponding fault cause information. Thereby realizing rapid, automatic and precise position of various faults in the process of processing and reporting the LACP packet by the actor device, overcoming the problem that the internal module cannot capture packets for positioning, and improving the efficiency of fault position.

DETAILED DESCRIPTION

Figure 1:
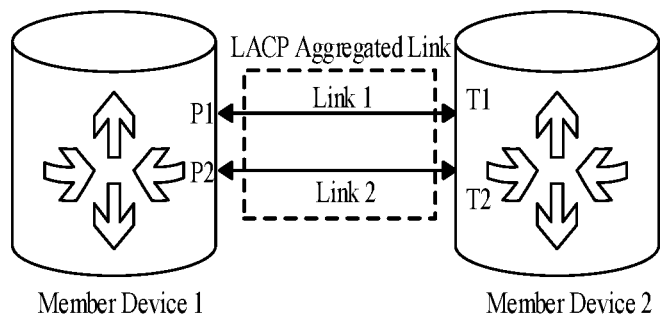
FIG. 1 is a diagram of a LACP-based link aggregation networking according to an exemplary embodiment of the present application.

Exemplary embodiments will be described in detail herein with the examples thereof expressed in the drawings. When the following descriptions involve the drawings, like numerals in different drawings represent like or similar elements unless stated otherwise. The implementations described in the following exemplary embodiments do not represent all implementations consistent with the present disclosure. On the contrary, they are merely examples of an apparatus and a method consistent with some aspects of the present disclosure described in detail in the appended claims.

The terms used in the present disclosure are for the purpose of describing a particular embodiment only, and are not intended to limit the present disclosure. The singular forms such as "a," "said," and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as "first," "second," "third," etc. in the present disclosure, the information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "in response to determining".

In order to enable those skilled in the art to better understand the technical solutions in the embodiments of the present application, the following briefly describes the related technology of fault detection of LACP packet timeout involved in the embodiments of the present application.

Please refer to FIG. 1, FIG. 1 is a diagram of a LACP-based link aggregation networking according to an exemplary embodiment of the present application.

A link aggregation networking shown in FIG. 1 includes member device 1 and member device 2. Member device 1 includes port P1 and port P2, and member device 2 includes port T1 and port T2.

As shown in FIG. 1, a link between port P1 and port T1 is link 1, and a link between port P2 and port T2 is link 2. Link 1 and link 2 are links that actually exist between member device 1 and member device 2.

A LACP aggregated link indicated by the dashed wireframe in FIG. 1 is an aggregated logical link between link 1 and link 2. The network traffic between member device 1 and member device 2 may perform bidirectional packet forwarding and traffic processing through the aggregated link.

During a process of establishing the LACP aggregated link, link 1 and link 2 are respectively determined by respective corresponding port of member device 1 and member device 2 through parameter negotiation based on LACP. Further, member device 1 and member device 2 may determine the priority of link 1 and link 2 in the LACP aggregated link by conducting election and negotiation based on LACP.

For example, based on LACP, member device 1 and member device 2 can determine that the link between port P1 and port T1 is a high-priority link, and the link between port P2 and port T2 is a low-priority link. That is, link 1 is a high-priority link, and link 2 is a low-priority link.

According to the LACP-based link aggregation networking shown in FIG. 1, in order to establish and maintain the LACP aggregated link, the port of member device 1 and the port of member device 2, which belong to the aggregation group of the aggregated link, are to perform LACP packet interaction with each other periodically, thereby completing LACP service procedures (such as port LACP parameter negotiation and port election) between member device 1 and member device 2. For details, please refer to the LACP protocol description, which will not be repeated here.

In some cases, a fault that no LACP packet from a corresponding port of member device 2 being received through the port of member device 1 continues for a preset waiting time may occur. This fault may cause a port election failure or election oscillation, thereby causing a link aggregation failure. In order to further locate the cause of the fault, a developer usually needs to analyze member device 1 and member device 2 by manually capturing packets. However, if the fault occurs in a plurality of LACP packet processors of member device 1, the fault cannot be analyzed by capturing packets, so that the specific LACP packet processor where the fault occurred and the detailed fault cause cannot be located.

On the basis of the networking architecture, the application aims to provide a method for implementing processor-level fault detection, the method includes: carrying a phase identifier to indicate a negotiation phase of a port LACP negotiation process based on a reserved field of a LACP packet; and recording a specific process of processing and reporting the LACP packet by a LACP packet processor integrated by an actor device based on the phase identifier.

In implementation, the link aggregation networking includes the member device, and the member device in the link aggregation networking may be an actor device as a LACP packet receiver or a partner device as a LACP packet sender.

Further, when the member device is an actor device, the actor device receives a LACP packet from a target port of a partner device through a local port, and sends a response LACP packet corresponding to the LACP packet to the target port. The LACP packet at least includes a phase identifier to indicate a negotiation phase of a LACP negotiation process between the target port and the local port.

Further, the actor device generates a LACP service processing entry for the LACP packet, and the LACP service processing entry is used to indicate a LACP service processing phase performed by the actor device for the LACP packet.

Further, in response to that no LACP packet from the target port being received through the local port continues for a preset waiting time, the actor device performs fault detection based on the phase identifier and the LACP service processing entry so to obtain fault cause information to indicate a LACP packet timeout of the target port.

In the above solutions, a phase identifier to indicate a negotiation phase of a port LACP negotiation process is carried based on a reserved field of a LACP packet, and a LACP service processing entry corresponding to the LACP packet is generated to record a LACP service processing process performed by an actor device for the LACP packet. In this way, if a timeout fault occurs when the local port receives a LACP packet from a target port, the fault detection may be performed based on the phase identifier and the LACP service processing entry to obtain corresponding fault cause information. Thereby effectively realizing rapid, automatic and precise position of various faults in the process of processing and reporting the LACP packet by the actor device, overcoming the problem that the internal module cannot capture packets for positioning, and improving the efficiency of fault position.

The disclosure will be described below through specific embodiments in combination with specific application scenarios.

Figure 2:
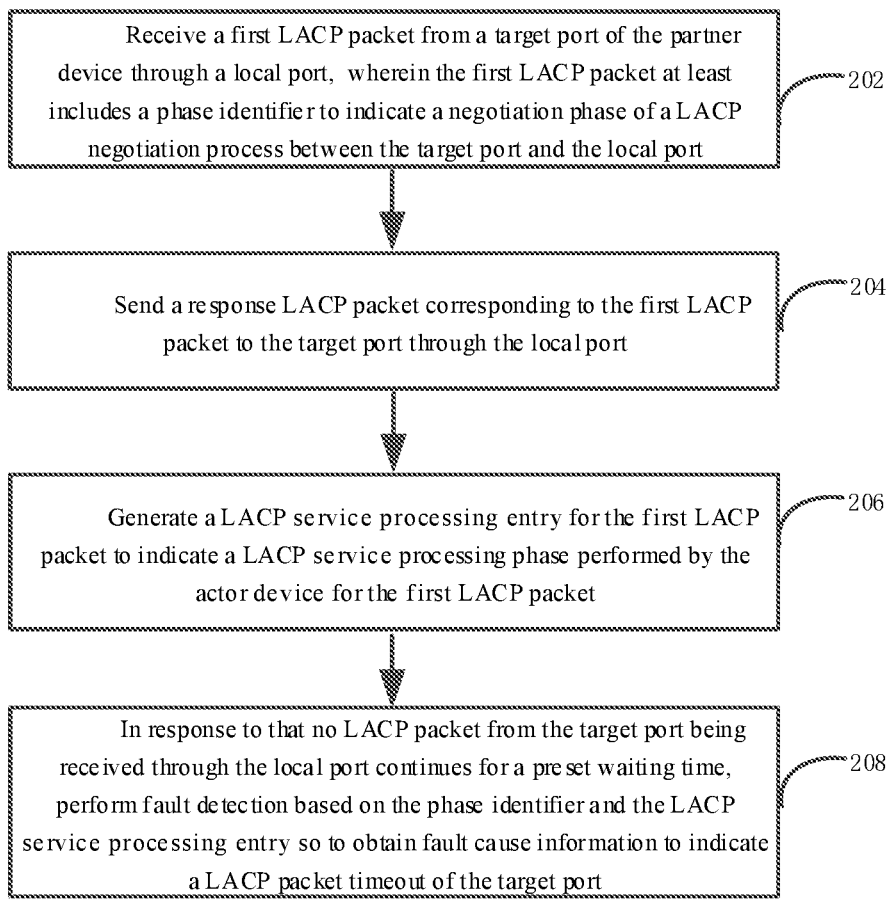
FIG. 2 is a flowchart of a method of detecting a fault due to a LACP packet timeout according to an exemplary embodiment of the present application.

Please refer to FIG. 2, FIG. 2 is a flowchart of a method of detecting a fault due to a LACP packet timeout according to an exemplary embodiment of the present application, and the method being applicable to a member device in a link aggregation networking. The member device in the link aggregation networking may be an actor device as a LACP packet receiver or a partner device as a LACP packet sender. When the member device is the actor device, the method performs steps 202 to 208.

Step 202: the actor device receives a first LACP packet from a target port of the partner device through a local port, wherein the first LACP packet at least includes a phase identifier to indicate a negotiation phase of a LACP negotiation process between the target port and the local port.

Step 204: the actor device sends a response LACP packet corresponding to the first LACP packet to the target port through the local port.

Step 206: the actor device generates a LACP service processing entry for the first LACP packet to indicate a LACP service processing phase performed by the actor device for the first LACP packet.

Step 208: in response to that no LACP packet from the target port being received through the local port continues for a preset waiting time, the actor device perform fault detection based on the phase identifier and the LACP service processing entry so to obtain fault cause information to indicate a LACP packet timeout of the target port.

In this disclosure, the link aggregation networking refers to a LACP-based link aggregation networking. For example, please refer to the link aggregation networking shown in FIG. 1, which has been described in detail above and will not be repeated here.

In this disclosure, the member device may include any form of network device supporting LACP in the above link aggregation networking. For example, in practical applications, the member device may include a switch, a router, a firewall, etc. supporting LACP in the above link aggregation networking.

In this disclosure, the member device may be an actor device as a LACP packet receiver or a partner device as a LACP packet sender.

For example, referring to FIG. 1, the member device may be member device 1 or member device 2. When a LACP packet is sent from member device 2 to member device 1, that is, member device 2 acts as the LACP packet sender and member device 1 acts as the LACP packet receiver, then member device 2 is a partner device, and member device 1 is an actor device.

In this disclosure, the actor device and the partner device are relative roles of the member device as the LACP packet receiver and sender, that is, the roles of the actor device and the partner device of the above member device can be interchangeable.

For example, referring to FIG. 1, when a LACP packet is sent from member device 1 to member device 2, that is, member device 1 acts as the LACP packet sender and member device 2 acts as the LACP packet receiver, then member device 1 is a partner device, and member device 2 is an actor device.

In this disclosure, the local port may include one or more ports used for LACP link aggregation when the member device is an actor device.

For example, referring to FIG. 1, the local port may include port P1 and/or port P2 used for LACP link aggregation when the member device 1 is an actor device.

In this disclosure, the target port may include one or more ports corresponding to the local port for LACP link aggregation when the member device is a partner device.

For example, referring to FIG. 1, the target port may include port T1 and/or port T2 corresponding to the local port for LACP link aggregation when the member device 2 is a partner device.

It should be noted that the target port and the local port are strictly corresponding. For example, if the local port includes port P1, the target port includes port T1. For example, if the local port includes port P2, the target port includes port T2. For another example, if the local port includes port P1 and port P2, the target port includes port T1 and port T2.

In this disclosure, the LACP packet may include a LACPDU (Link Aggregation Control Protocol Data Unit) packet for communicating between the member devices in the link aggregation networking.

For example, referring to FIG. 1, the LACP packet may include LACPDU packets for communicating between member device 1 and member device 2.

In order to facilitate understanding, here is a brief introduction to the main composition and purpose of the LACPDU packets.

Two parties (called as Actor and Partner respectively, that is, the actor device/local device and the partner device, referred to as "actor" and "partner" in short respectively) to be aggregated based on LACP interact aggregation information of the actor and the partner with each other through LACPDU packets, so as to reach a consensus on the understanding of the entire link aggregation.

The LACPDU packets mainly contain the following information: system priority of the actor and the partner, system ID of the actor and the partner, port operation key of the actor and the partner, port priority of the actor and the partner, port ID of the actor and the partner, port state of the actor and the partner.

Two parties to be aggregated based on LACP select the appropriate link according to a certain selection algorithm based on the information, and control the state of aggregation. The selected member link may forward traffic normally, while the unselected member link may be set to a blocked state and cannot forward any traffic. The total bandwidth of the aggregated link is equal to the sum of the bandwidth of the selected member link, and the traffic of the aggregated link will be shared to each selected member link according to certain rules. Since the LACPDU packets are periodically interactive, that is, the two parties to be aggregated may send protocol packets to each other at regular intervals. Therefore, when a selected member link fails to work for some cause, the link aggregation can quickly sense, and reset the link state, that is, the link that cannot work is set to the blocked state, so that the traffic is redistributed to other selected member links. In this way, the functions of increasing bandwidth and link dynamic backup are realized.

Figure 3:
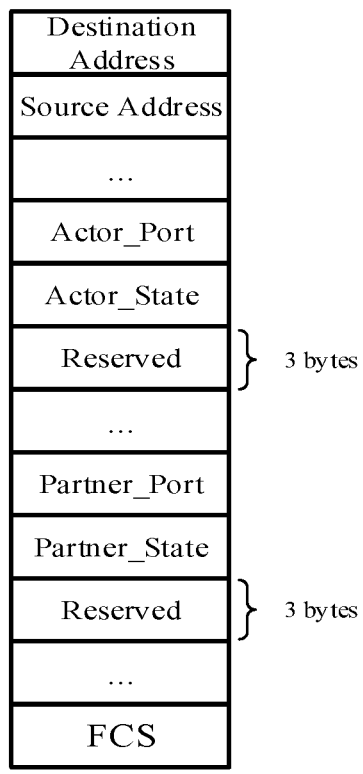
FIG. 3 is a schematic diagram of a packet format of a LACPDU packet provided according to an exemplary embodiment of the present application.

Please refer to FIG. 3, FIG. 3 is a schematic diagram of a packet format of a LACPDU packet provided according to an exemplary embodiment of the present application.

As shown in FIG. 3, the packet format of the LACPDU packets include a plurality of fields: Destination Address, Source Address, . . . , Actor_Port, Actor_State, Reserved (reserved field occupying 3 bytes) . . . , Partner_Port, Partner_State, Reserved (reserved fields occupying 3 bytes) . . . , FCS.

For the specific meaning of a plurality of fields in the packet format of the LACPDU packets, please refer to the description of the existing LACPDU packet format, which will not be repeated here.

In this disclosure, the phase identifier refers to a user-defined identifier included in the LACP packet to indicate a LACP negotiation process between the target port and the local port.

In an illustrated embodiment, the phase identifier is carried in a reserved field concerning port in the first LACP packet.

For example, the phase identifier may be carried in a reserved field concerning actor port in the LACP packet (3-byte Reserved field after the Actor_State as shown in FIG. 3), or the phase identifier may be carried in a reserved field concerning partner port in the LACP packet (3-byte Reserved field after the Partner_State as shown in FIG. 3).

In practical applications, the phase identifier may specifically be carried in the lower 8 bits of the reserved field concerning actor port in the LACP packet (3-byte Reserved field after the Actor_State as shown in FIG. 3), or the phase identifier may be carried in the lower 8 bits of the reserved field concerning partner port in the LACP packet (3-byte Reserved field after the Partner_State as shown in FIG. 3).

It should be noted that the position and the number of bits of the designated bit which is used to carry the phase identifier in the reserved field of the LACP packet may also be other combinations, which are not specifically limited in this disclosure.

In an illustrated embodiment, the member device includes a plurality of LACP packet processors, each of the plurality of LACP packet processors corresponds to one of a plurality of LACP service processing phases performed for the LACP packet.

For example, in practical applications, the member device may include a packet chip receiver, a packet uploading channel processor, a packet CPU processor, and a packet dynamics link aggregator, etc. respectively corresponding to the LACP service processing phases performed for the LACP packet. A plurality of LACP packet processors gradually upload and process the LACP packet, each of the plurality of LACP packet processors corresponds to one of a plurality of LACP service processing phases.

In this disclosure, LACP negotiation basic information is used to indicate one or more port LACP negotiation parameters determined by a LACP negotiation between the target port and the local port.

For example, in practical applications, the LACP negotiation basic information may include the port id, MAC, duplex rate, system priority, etc. of the actor and the partner. For detailed information about the LACP negotiation basic information, please refer to the description of the LACP protocol.

In this disclosure, the LACP service processing identifier is used to indicate an order of the LACP service processing phases and the fault cause information to indicate the LACP packet timeout, and each of the LACP service processing phases corresponds to one of the plurality of LACP packet processors. The LACP service processing identifiers may be generated by the plurality of LACP packet processors in the member device when performing LACP service processing on the LACP packet.

For example, in practical applications, the packet chip receiver, the packet uploading channel processor, the packet CPU processor, and the packet dynamic link aggregator respectively generate corresponding LACP service processing identifiers when performing LACP service processing on the LACP packet, respectively. The LACP service processing identifier may be used to indicate an order of the LACP service processing phases and the fault cause information to indicate the LACP packet timeout, and each of the LACP service processing phases corresponds to one of the plurality of LACP packet processors.

In this disclosure, a LACP tracking entry may be used to indicate a LACP service processing phase performed by the actor device for the first LACP packet.

In an illustrated embodiment, the LACP service processing entry at least includes LACP negotiation basic information and a LACP service processing identifier.

Continuing with the above example, in practical applications, the LACP service processing entry may include LACP service processing identifiers respectively corresponding to the packet chip receiver, the packet uploading channel processor, the packet CPU processor, and the packet dynamic link aggregator besides the LACP negotiation basic information.

In this disclosure, the member device generates a LACP service processing entry corresponding to the LACP packet.

Continuing with the above example, the packet chip receiver generates a LACP service processing entry corresponding to the LACP packet after receiving the LACP packet. And the LACP packet is sent by the packet chip receiver to the packet loading channel processor to continue processing, and the packet loading channel processor generates a LACP service processing entry corresponding to the LACP packet in the LACP tracking entry. Next, the LACP packet is sent by the packet loading channel processor to the packet CPU processor to continue processing, and the packet CPU processor generates a LACP service processing entry corresponding to the LACP packet in the LACP tracking entry. Further, the LACP packet is sent by the packet CPU processor to the packet dynamic link aggregator to continue processing, and the packet dynamic link aggregator generates a LACP service processing entry corresponding to the LACP packet in the LACP tracking entry.

It should be noted that each LACP service processing entry corresponding to the LACP packet may be uniformly stored in the LACP tracking entry by the member device.

In an illustrated embodiment, generating a LACP service processing entry for the first LACP packet in the LACP tracking entry including: analyzing, by the member device, the first LACP packet so to obtain LACP negotiation basic information corresponding to the first LACP packet.

For example, in practical applications, the member device performs packet analysis on the LACP packet to obtain LACP negotiation basic information corresponding to the LACP packet. The LACP negotiation basic information may include the port id, MAC, duplex rate, system priority, etc. of the actor and the partner. For detailed information about the LACP negotiation basic information, please refer to the description of the LACP protocol.

In this disclosure, further, the plurality of LACP packet processors perform an auto-increment operation to a value of the phase identifier so to determine a plurality of LACP service processing identifiers, each of the plurality of LACP service processing identifiers corresponds one of the plurality of LACP service processing phases.

For example, the phase identifier may be the lower 8 bits of the Reserved field for the actor and the partner; an initial value of the phase identifier is 1; the packet chip receiver, the packet uploading channel processor, the packet CPU processor, and the packet dynamic link aggregator respectively perform LACP service processing on the LACP packet, and perform an auto-increment operation to the initial value so to determine a plurality of LACP service processing identifiers, and each of the plurality of LACP service processing identifiers corresponds one of the plurality of LACP service processing phases; the plurality of LACP service processing identifiers may include 2, 3, 4, 5.

Of course, in practical applications, the plurality of LACP packet processors may correspond to a plurality of LACP service processing identifiers, and the plurality of LACP service processing identifiers may include 2, 3, 4, 5, 6, 7, 8, 9.

In this disclosure, further, the plurality of LACP packet processors write the plurality of LACP service processing identifiers and the LACP negotiation basic information into the LACP service processing entries for the first LACP packet, and each of the plurality of LACP service processing identifiers corresponds to one of the plurality of LACP packet processors.

For example, the plurality of LACP packet processors may write a plurality of service processing identifiers corresponding to the plurality of LACP packet processors for link 1 as shown in FIG. 1 and LACP negotiation basic information into the LACP service processing entries corresponding to the LACP packet; and the plurality of LACP packet processors may write a plurality of service processing identifiers corresponding to the plurality of LACP packet processors for link 2 as shown in FIG. 1 and LACP negotiation basic information into the LACP service processing entry corresponding to the LACP packet.

In an illustrated embodiment, after performing the auto-increment operation to a value of the phase identifier, the member device generates a second LACP packet carrying a phase identifier of which a value has been subjected to the auto-increment operation, and sends the second LACP packet from the local port to the target port; so that the partner device sends back a LACP packet to the local port after performing corresponding LACP service processing through the target port.

For example, after performing the auto-increment operation to a value of the phase identifier, the value of the phase identifier is 10, and the member device generates a LACP packet carrying the phase identifier with a value of 10, and sends the packet to the target port from the local port; so that the partner device sends back a LACP packet to the local port after performing corresponding LACP service processing through the target port.

It should be noted that the process in which the partner device executes the corresponding LACP service processing through the target port is similar to the process in which the member device is the actor device, which has been described above and will not be repeated here. For example, after the partner device executes the corresponding LACP service processing through the target port, a value of the phase identifier is 16, and the target port sends back a LACP packet carrying the phase identifier (the value is 16) to the local port.

In an illustrated embodiment, in addition to the LACP negotiation basic information and the LACP service processing identifier, the LACP service processing entry may further include fault cause information which is associated with the LACP service processing identifier and indicates a fault cause leading to an error during a LACP service processing executed by the LACP packet processor.

For example, the fault cause information may include a fault cause leading to an error during the LACP packet processors (the packet chip receiver, the packet uploading channel processor, and the packet CPU processor) respectively execute LACP service processing; wherein, the fault cause may specifically include a LACP packet loss fault that may exist for the LACP packet processor. The fault cause may also be "no fault" or "unknown", which is used to indicate that the processing for the LACP packet is normal or the fault cause is unknown, respectively.

In this disclosure, in response to that no LACP packet from the target port being received through the local port continues for a preset waiting time, the member device performs fault detection based on the phase identifier and a LACP tracking entry so to obtain fault cause information to indicate a LACP packet timeout of the target port.

For example, please refer to FIG. 1, in response to that no LACP packet from port T1 being received through the port p1 continues for a preset waiting time, the member device performs fault detection based on the corresponding phase identifier and a LACP tracking entry so to obtain fault cause information to indicate a LACP packet timeout of port T1.

For another example, please refer to FIG. 1, in response to that no LACP packet from port T2 being received through the port p2 continues for a preset waiting time, the member device performs fault detection based on the corresponding phase identifier and a LACP tracking entry so to obtain fault cause information to indicate a LACP packet timeout of port T2.

It should be noted that based on the LACP protocol agreement, the above preset waiting time usually means that when the actor receives a LACP packet from the partner, if no LACP packet from the partner being received continues for the receiving time of 3 consecutive LACP packets (for example, within 300 milliseconds), the actor can determine that the LACP packet sent by the partner has timed out.

In practical applications, in addition to a fault cause that the partner does not send a LACP packet within the preset waiting time, there may actually be a case that the partner has sent the LACP packet within the preset waiting time, but the LACP packet processors (the packet chip receiver, the packet uploading channel processor, the packet CPU processor) of the actor may have a LACP packet loss fault.

In an illustrated embodiment, in response to that no LACP packet from the target port being received through the local port continues for the preset waiting time, the member device determines all LACP service processing entries for the target port in the LACP tracking entry based on the phase identifier.

In implementation, the member device determines all LACP service processing entries for the target port from the LACP tracking entry based on a latest value of the phase identifier carried in the received LACP packet and the local port.

For example, in practical applications, the member device determines all LACP service processing entries for the target port (port T1) from the LACP tracking entry based on a latest value (for example, 16) of the phase identifier carried in the received LACP packet and the local port (port P1).

For another example, in practical applications, the member device determines all LACP service processing entries corresponding to the target port (port T2) from the LACP tracking entry based on a latest value (for example, 18) of the phase identifier carried in the received LACP packet and the local port (port P2).

In this disclosure, further, the member device determines a LACP service processing entry with a packet loss fault as a fault cause entry from all LACP service processing entries.

Taking the local port as port P1 and the target port as port T1 for example. Assuming that there are five LACP service processing entries corresponding to port T1. If one LACP service processing entry has a packet loss fault of the LACP packet, then the one LACP service processing entry serves as a fault cause entry.

In this disclosure, further, the member device searches the fault cause entry for the fault cause information to indicate the LACP packet timeout of the target port.

For example, the member device searches the fault cause entry for the fault cause information to indicate the LACP packet timeout of port T2; the fault cause information may be that one or more of the packet chip receiver, the packet uploading channel processor, and the packet CPU processors have a packet loss fault.

It should be noted that, a packet loss fault caused when the LACP packet processors (the packet chip receiver, the packet uploading channel processor, and the packet CPU processor) of the actor performing packet processing on the LACP packet may not be counted and discovered by capturing packets using a common packet capture tool.

In an illustrated embodiment, further, the member device obtains LACP negotiation basic information from the fault cause entry after obtaining the fault cause information to indicate the LACP packet timeout of the target port; and the member device outputs an alarm for user to locate a LACP fault based on the LACP negotiation basic information and the fault cause information to indicate the LACP packet timeout of the target port obtained from the fault cause entry.

For example, the member device may output an alarm for user to locate a LACP fault based on the LACP negotiation basic information of port P1 and port T1 and the fault cause information to indicate the LACP packet timeout of port T1 obtained from the fault cause entry.

In an illustrated embodiment, in response to that a third LACP packet from the target port is received through the local port within the preset waiting time, the member device performs a LACP negotiation based on continuously sending and receiving one or more LACP packets between the local port and the target port until the LACP negotiation between the local port and the target port is completed.

For example, in response to that a LACP packet from the target port is received through the local port within the preset waiting time, the member device performs a LACP negotiation based on continuously sending and receiving one or more LACP packets with the phase identifier between port P1 and port T1 until the LACP negotiation between port P1 and port T1 is completed. For the specific negotiation process, please refer to the LACP protocol.

In the above technical solutions, a phase identifier to indicate a negotiation phase of a port LACP negotiation process is carried based on a reserved field of a LACP packet; and a LACP service processing entry corresponding to the LACP packet is generated to record a LACP service processing process performed by an actor device for the LACP packet. If a timeout fault occurs when the local port receives a LACP packet from a target port, the fault detection is performed based on the phase identifier and the LACP service processing entry to obtain corresponding fault cause information. Thereby realizing rapid, automatic and precise position of various faults in the process of processing and reporting the LACP packet by the actor device, overcoming the problem that the internal module cannot capture packets for positioning, and improving the efficiency of fault position.

Figure 4:
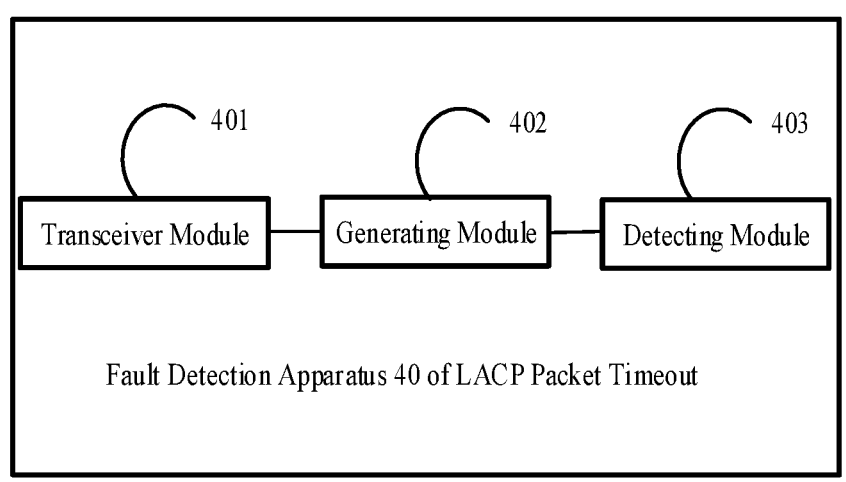
FIG. 4 is a block diagram of an apparatus of detecting a fault due to a LACP packet timeout according to an exemplary embodiment of the present application.

FIG. 4 is a block diagram of an apparatus of detecting a fault due to a LACP packet timeout according to an exemplary embodiment of the present application. Corresponding to the foregoing method embodiments, this disclosure also provides an embodiment of an apparatus of detecting a fault due to a LACP packet timeout. The apparatus being applicable to a member device in a link aggregation networking which includes an actor device as a LACP packet receiver and a partner device as a LACP packet sender. Referring to an example of a fault detection apparatus 40 of a LACP packet timeout in FIG. 4, the apparatus includes a transceiver module 401, a generating module 402, a detecting module 403.

The transceiver module 401 is configured to receive, by the actor device and through a local port, a first LACP packet from a target port of the partner device, and send a response LACP packet corresponding to the first LACP packet to the target port, wherein the first LACP packet at least includes a phase identifier to indicate a negotiation phase of a LACP negotiation process between the target port and the local port.

The generating module 402 is configured to generate, by the actor device, a LACP service processing entry for the first LACP packet to indicate a LACP service processing phase performed by the actor device for the first LACP packet.

The detecting module 403 is configured to perform, by the actor device and in response to that no LACP packet from the target port being received through the local port continues for a preset waiting time, fault detection based on the phase identifier and the LACP service processing entry so to obtain fault cause information to indicate a LACP packet timeout of the target port.

In this embodiment, the phase identifier is carried in a reserved field concerning port of the first LACP packet.

In this embodiment, the member device includes a plurality of LACP packet processors, each of the plurality of LACP packet processors corresponds to one of a plurality of LACP service processing phases; and the LACP service processing entry at least includes: LACP negotiation basic information to indicate one or more port LACP negotiation parameters determined by a LACP negotiation between the target port and the local port; a LACP service processing identifier to indicate an order of the LACP service processing phases and the fault cause information.

The generating module 402 is further configured to: analyze, by the actor device, the first LACP packet so to obtain the LACP negotiation basic information corresponding to the first LACP packet; perform, by the plurality of LACP packet processors, an auto-increment operation to a value of the phase identifier so to determine a plurality of LACP service processing identifiers, each of the plurality of LACP service processing identifiers corresponds one of the plurality of LACP service processing phases; and write, by the actor device, the plurality of LACP service processing identifiers and the LACP negotiation basic information into the LACP service processing entry for the first LACP packet.

In this embodiment, the generating module 402 is further configured to generate, by the actor device, a second LACP packet carrying a phase identifier of which a value has been subjected to the auto-increment operation; and send, by the actor device, the second LACP packet from the local port to the target port.

In this embodiment, the LACP service processing entry further includes fault cause information which is associated with the LACP service processing identifier and indicates a fault cause leading to an error during a LACP service processing executed by the LACP packet processor.

The detecting module 403 is further configured to: determine, by the actor device and in response to that no LACP packet from the target port being received through the local port continues for the preset waiting time, all LACP service processing entries for the target port based on the phase identifier; determine, by the actor device and from the all LACP service processing entries, a LACP service processing entry with a packet loss fault as a fault cause entry; search, by the actor device, the fault cause entry for the fault cause information.

In this embodiment, the detecting module 403 is further configured to: obtain, by the actor device, LACP negotiation basic information from the fault cause entry; output, by the actor device and based on the LACP negotiation basic information and the fault cause information obtained from the fault cause entry, an alarm for user to locate a LACP fault.

In this embodiment, the transceiver module 401 is further configured to: perform, by the actor device and in response to that a third LACP packet from the target port is received through the local port within the preset waiting time, a LACP negotiation based on continuously sending and receiving one or more LACP packets with the phase identifier between the local port and the target port until the LACP negotiation between the local port and the target port is completed.

For the apparatus example, since it basically corresponds to the method example, reference may be made to the partial description of the method example. The apparatus examples described above are merely illustrative, wherein the modules/units described as separate components may or may not be physically separate, and the components displayed as modules/units may or may not be physical modules/units, that is, may be located at one place, or can be distributed to multiple network modules/units. Some or all the modules/units may be selected according to actual needs to achieve the objectives of the present disclosure. It can be understood and implemented by those of ordinary skill in the art without any creative effort.

The systems, apparatuses, modules, or units set forth in the foregoing embodiments may be specifically implemented by a computer chip or an entity, or implemented by a product having a certain function. A typical implementation device is a computer, and a specific form of the computer may be a personal computer, a laptop computer, a cellular phone, a camera phone, a smart phone, a personal digital assistant, a media player, a navigation device, an e-mail transceiver device, a game console, a tablet computer, a wearable device, or a combination of any of these devices.

Figure 5:
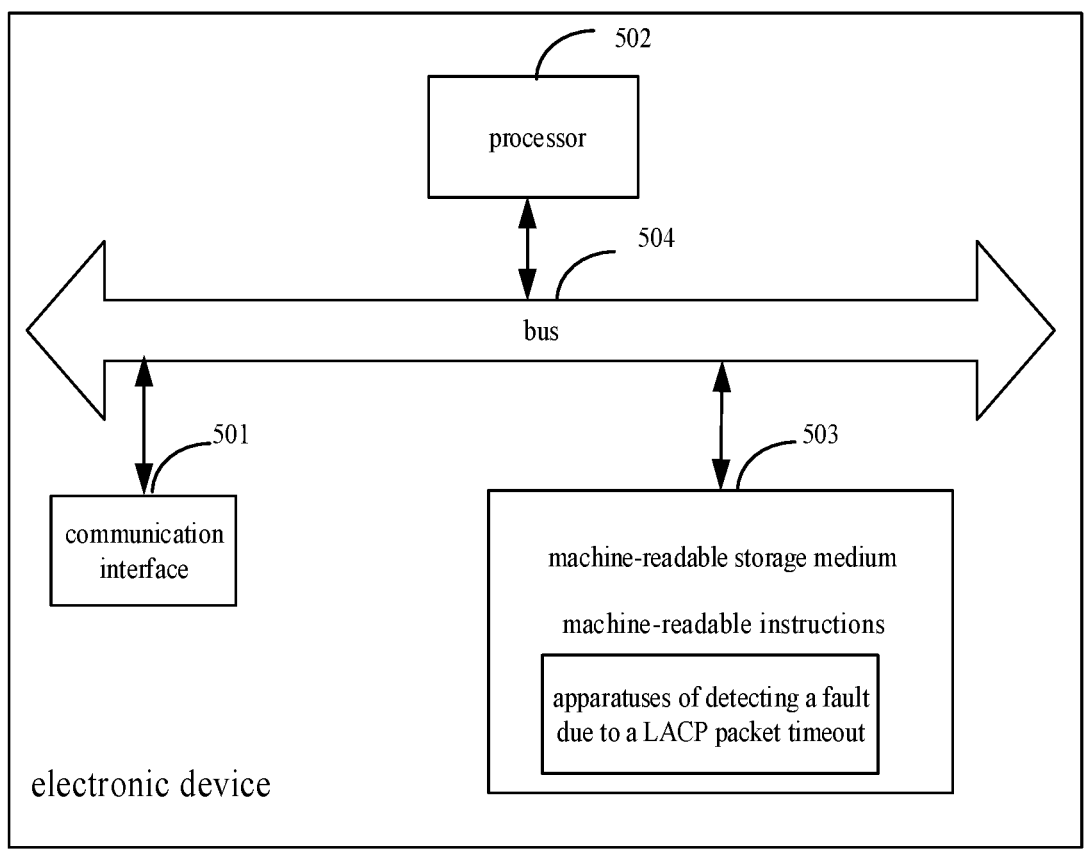
FIG. 5 is a hardware structure diagram of an electronic device according to an exemplary embodiment of the present application.

The embodiment of an apparatus of detecting a fault due to a LACP packet timeout of the present application may be applied to the electronic device shown in FIG. 5. The apparatus embodiment may be implemented by software, or implemented by hardware or a combination of software and hardware. Taking software as an example, as an apparatus in a logical sense, corresponding computer program instructions in a machine-readable storage medium are read by a processor of an electronic device where the apparatus is located, and then the generated machine executable instructions are executed. From the hardware level, as shown in FIG. 5, it is a hardware structural diagram of an electronic device where an apparatus for detecting a fault of LACP packet timeout in the present application is located. In addition to the processor, the communication interface, the bus and the machine-readable storage medium shown in FIG. 5, an electronic device where the apparatus is located in an embodiment generally may further include other hardware according to the actual function of the electronic device, which is not described herein again.

Correspondingly, an embodiment of the present application further provides a hardware structure of an electronic device where the apparatus is located shown in FIG. 4. Referring to FIG. 5, FIG. 5 is a hardware structure diagram of an electronic device according to an exemplary embodiment of the present application. The device includes a communication interface 501, a processor 502, a machine-readable storage medium 503, and a bus 504. The communication interface 501, the processor 502, and the machine-readable storage medium 503 communicate with each other through the bus 504. The communication interface 501 is configured to perform network communication. The processor 502 may be a central processing unit (CPU), and the processor 502 may execute machine-readable instructions stored in the machine-readable storage medium 503 to implement the method described above.

The machine-readable storage medium 503 mentioned herein may be any electronic, magnetic, optical or other physical storage device, may contain or store information, such as executable instructions, data, etc. For example, the machine-readable storage medium may be a transitory memory, a non-transitory memory, or similar storage medium. Specifically, the machine-readable storage medium 503 may be a RAM (Radom Access Memory), a flash memory, a storage drive (such as a hard disk drive), a solid state disk, a storage disk of any type (such as an optical disk, a DVD, etc.), or a similar storage medium, or a combination thereof.

So far, the hardware structure description shown in FIG. 5 is completed.

In addition, an embodiment of the present application further provides a machine-readable storage medium including machine-executable instructions, for example, the machine-readable storage medium 503 in FIG. 5, the machine-executable instructions being executable by a processor 502 in a data processing apparatus to implement the data processing method described above.

The implementation process of functions and effects of various units in the apparatus is specifically described in the implementation process of the corresponding steps in the aforementioned method, and details are not described herein again Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It should be understood that this disclosure is not limited to the precise structure that has been described above and shown in the drawings, and various modifications and changes can be made without departing from its scope. The scope of this specification is limited by the appended claims.

Some examples of the present disclosure are described above and are not intended to limit the disclosure. Any variations, equivalent replacements, modifications or the like within the spirit and principles of the present disclosure should fall within the scope of the present disclosure.

The invention claimed is:

1. A method of detecting a fault due to a LACP packet timeout, wherein the method being applicable to a member device in a link aggregation networking which comprises an actor device as a LACP packet receiver and a partner device as a LACP packet sender, the method comprising:
    receiving, by the actor device and through a local port, a first LACP packet from a target port of the partner device, wherein the first LACP packet at least comprises a phase identifier to indicate a negotiation phase of a LACP negotiation process between the target port and the local port;
    sending, by the actor device and through the local port, a response LACP packet corresponding to the first LACP packet to the target port;
    generating, by the actor device, a LACP service processing entry for the first LACP packet to indicate a LACP service processing phase performed by the actor device for the first LACP packet;
    performing, by the actor device and in response to that no LACP packet from the target port being received through the local port continues for a preset waiting time, fault detection based on the phase identifier and the LACP service processing entry so to obtain fault cause information to indicate a LACP packet timeout of the target port.

2. The method according to claim 1, wherein the phase identifier is carried in a reserved field concerning port of the first LACP packet.

3. The method according to claim 1, wherein:
    the member device comprises a plurality of LACP packet processors, each of the plurality of LACP packet processors corresponds to one of a plurality of LACP service processing phases; and the LACP service processing entry at least comprises:
    LACP negotiation basic information to indicate one or more port LACP negotiation parameters determined by a LACP negotiation between the target port and the local port;
    a LACP service processing identifier to indicate an order of the LACP service processing phases and the fault cause information.

4. The method according to claim 3, wherein generating a LACP service processing entry for the first LACP packet comprising:
    analyzing, by the actor device, the first LACP packet so to obtain the LACP negotiation basic information corresponding to the first LACP packet;
    performing, by the plurality of LACP packet processors, an auto-increment operation to a value of the phase identifier so to determine a plurality of LACP service processing identifiers, each of the plurality of LACP service processing identifiers corresponds one of the plurality of LACP service processing phases; and
    writing, by the actor device, the plurality of LACP service processing identifiers and the LACP negotiation basic information into the LACP service processing entry for the first LACP packet.

5. The method according to claim 4, further comprising:
    generating, by the actor device, a second LACP packet carrying a phase identifier of which a value has been subjected to the auto-increment operation; and
    sending, by the actor device, the second LACP packet from the local port to the target port.

6. The method according to claim 4, wherein:
    the LACP service processing entry further comprises fault cause information which is associated with the LACP service processing identifier and indicates a fault cause leading to an error during a LACP service processing executed by a LACP packet processor.

7. The method according to claim 6, wherein performing, by the actor device and in response to that no LACP packet from the target port being received through the local port continues for a preset waiting time, fault detection based on the phase identifier and the LACP service processing entry so to obtain fault cause information to indicate a LACP packet timeout of the target port, comprising:
    determining, by the actor device and in response to that no LACP packet from the target port being received through the local port continues for the preset waiting time, all LACP service processing entries for the target port based on the phase identifier;
    determining, by the actor device and from the all LACP service processing entries, a LACP service processing entry with a packet loss fault as a fault cause entry;
    searching, by the actor device, the fault cause entry for the fault cause information.

8. The method according to claim 7, further comprising:
    obtaining, by the actor device, LACP negotiation basic information from the fault cause entry;
    outputting, by the actor device and based on the LACP negotiation basic information and the fault cause information obtained from the fault cause entry, an alarm for user to locate a LACP fault.

9. The method according to claim 1, further comprising:
    performing, by the actor device and in response to that a third LACP packet from the target port is received through the local port within the preset waiting time, a LACP negotiation based on continuously sending and receiving one or more LACP packets with the phase identifier between the local port and the target port until the LACP negotiation between the local port and the target port is completed.

10. An electronic device, wherein the electronic device being applicable to a member device in a link aggregation networking which comprises an actor device as a LACP packet receiver and a partner device as a LACP packet sender, the electronic device comprising:
a communication interface;
a processor;
a memory for storing machine-readable instructions executable by the processor to perform:
receiving, by the actor device and through a local port, a first LACP packet from a target port of the partner device, wherein the first LACP packet at least comprises a phase identifier to indicate a negotiation phase of a LACP negotiation process between the target port and the local port;
sending, by the actor device and through the local port, a response LACP packet corresponding to the first LACP packet to the target port;
generating, by the actor device, a LACP service processing entry for the first LACP packet to indicate a LACP service processing phase performed by the actor device for the first LACP packet;
performing, by the actor device and in response to that no LACP packet from the target port being received through the local port continues for a preset waiting time, fault detection based on the phase identifier and the LACP service processing entry so to obtain fault cause information to indicate a LACP packet timeout of the target port.

11. The electronic device according to claim 10, wherein the phase identifier is carried in a reserved field concerning port of the first LACP packet.

12. The electronic device according to claim 10, wherein:
the member device comprises a plurality of LACP packet processors, each of the plurality of LACP packet processors corresponds to one of a plurality of LACP service processing phases; and the LACP service processing entry at least comprises:
LACP negotiation basic information to indicate one or more port LACP negotiation parameters determined by a LACP negotiation between the target port and the local port;
a LACP service processing identifier to indicate an order of the LACP service processing phases and the fault cause information.

13. The electronic device according to claim 12, wherein when generating a LACP service processing entry for the first LACP packet, the processor is configured to perform:
analyzing, by the actor device, the first LACP packet so to obtain the LACP negotiation basic information corresponding to the first LACP packet;
performing, by the plurality of LACP packet processors, an auto-increment operation to a value of the phase identifier so to determine a plurality of LACP service processing identifiers, each of the plurality of LACP service processing identifiers corresponds one of the plurality of LACP service processing phases; and
writing, by the actor device, the plurality of LACP service processing identifiers and the LACP negotiation basic information into the LACP service processing entry for the first LACP packet.

14. The electronic device according to claim 13, wherein the processor is further configured to perform:

generating, by the actor device, a second LACP packet carrying a phase identifier of which a value has been subjected to the auto-increment operation; and
sending, by the actor device, the second LACP packet from the local port to the target port.

15. The electronic device according to claim 13, wherein:
the LACP service processing entry further comprises fault cause information which is associated with the LACP service processing identifier and indicates a fault cause leading to an error during a LACP service processing executed by the LACP packet processor.

16. The electronic device according to claim 15, wherein the processor is configured to perform:
determining, by the actor device and in response to that no LACP packet from the target port being received through the local port continues for the preset waiting time, all LACP service processing entries for the target port based on the phase identifier;
determining, by the actor device and from the all LACP service processing entries, a LACP service processing entry with a packet loss fault as a fault cause entry;
searching, by the actor device, the fault cause entry for the fault cause information.

17. The electronic device according to claim 16, wherein the processor is further configured to perform:
obtaining, by the actor device, LACP negotiation basic information from the fault cause entry;
outputting, by the actor device and based on the LACP negotiation basic information and the fault cause information obtained from the fault cause entry, an alarm for user to locate a LACP fault.

18. The electronic device according to claim 10, wherein the processor is further configured to perform:
performing, by the actor device and in response to that a third LACP packet from the target port is received through the local port within the preset waiting time, a LACP negotiation based on continuously sending and receiving one or more LACP packets with the phase identifier between the local port and the target port until the LACP negotiation between the local port and the target port is completed.

19. A non-transitory memory having machine-readable instructions stored thereon, and when invoked and executed by a processor, the machine-readable instructions implement a method comprising:
receiving, by an actor device and through a local port, a first LACP packet from a target port of a partner device, wherein the first LACP packet at least comprises a phase identifier to indicate a negotiation phase of a LACP negotiation process between the target port and the local port;
sending, by the actor device and through the local port, a response LACP packet corresponding to the first LACP packet to the target port;
generating, by the actor device, a LACP service processing entry for the first LACP packet to indicate a LACP service processing phase performed by the actor device for the first LACP packet;
performing, by the actor device and in response to that no LACP packet from the target port being received through the local port continues for a preset waiting time, fault detection based on the phase identifier and the LACP service processing entry so to obtain fault cause information to indicate a LACP packet timeout of the target port.

* * * * *